United States Patent
Kobayashi et al.

(10) Patent No.: US 9,239,412 B2
(45) Date of Patent: Jan. 19, 2016

(54) RETROREFLECTIVE MEMBER PRODUCING IRIDESCENT REFLECTED LIGHT

(71) Applicant: Marujin Co., Ltd., Fukui (JP)

(72) Inventors: Hironori Kobayashi, Fukui (JP); Shojiro Amemori, Fukui (JP)

(73) Assignee: Marujin Co., Ltd., Fukui (JP)

( * ) Notice: Subject to any disclaimer, the term of this patent is extended or adjusted under 35 U.S.C. 154(b) by 120 days.

(21) Appl. No.: 14/100,276

(22) Filed: Dec. 9, 2013

(65) Prior Publication Data

US 2014/0092474 A1 Apr. 3, 2014

Related U.S. Application Data

(62) Division of application No. 12/665,713, filed as application No. PCT/JP2008/061237 on Jun. 19, 2008, now Pat. No. 8,684,544.

(30) Foreign Application Priority Data

Jun. 19, 2007 (JP) .................. 2007-161170

(51) Int. Cl.
*G02B 5/128* (2006.01)
*G02B 5/28* (2006.01)

(52) U.S. Cl.
CPC ............... *G02B 5/128* (2013.01); *G02B 5/285* (2013.01)

(58) Field of Classification Search
CPC ........... G02B 5/128; G02B 5/285; G02B 5/28
USPC ................................................. 359/536–542
See application file for complete search history.

(56) References Cited

U.S. PATENT DOCUMENTS

| 4,763,985 A | 8/1988 | Bingham |
| 5,169,707 A | 12/1992 | Faykish et al. |

(Continued)

FOREIGN PATENT DOCUMENTS

| CN | 1977190 | 6/2007 |
| JP | 63-38902 | 2/1988 |

(Continued)

OTHER PUBLICATIONS

Japanese Patent Abstract for Publication No. 11-167010, published Jun. 22, 1999, 12 pages.

(Continued)

*Primary Examiner* — James Phan
(74) *Attorney, Agent, or Firm* — Rankin, Hill & Clark LLP

(57) ABSTRACT

A retroreflective member that can improve the visibility further. The retroreflective member includes a reflective layer and transparent microscopic beads 13. The retroreflective member gives a phase difference corresponding to a visible light wavelength to at least a part of incident light and recombines, emphasizes a light component having the visible light wavelength by interference, and returns coherent light having a visible light wavelength depending on the incident angle in the traveling direction of the incident light. The reflective layer includes a light-transmissive interference layer 14, and the interference layer 14 each has an optical layer thickness of 100 to 600 nm so as to generate an interference color having a visible light wavelength depending on the incident angle of light.

10 Claims, 9 Drawing Sheets

(56) References Cited

U.S. PATENT DOCUMENTS

| | | |
|---|---|---|
| 6,000,804 A | 12/1999 | Kimura |
| 6,350,034 B1 | 2/2002 | Fleming et al. |
| 2003/0093718 A1 | 5/2003 | Sutton |
| 2005/0162742 A1 | 7/2005 | Fleming et al. |
| 2011/0200789 A1 | 8/2011 | Budd et al. |

FOREIGN PATENT DOCUMENTS

| | | |
|---|---|---|
| JP | 6-507737 | 9/1994 |
| JP | 10-500230 | 1/1998 |
| JP | 11-167010 | 6/1999 |
| JP | 3432507 | 5/2003 |
| JP | 2004-294668 | 10/2004 |
| JP | 2005-522730 | 7/2005 |
| JP | 2007-517265 | 6/2007 |
| WO | 92/19994 | 11/1992 |
| WO | 95/03746 | 2/1995 |
| WO | 03/087896 | 10/2003 |
| WO | 2005/006667 A1 | 1/2005 |
| WO | 2005/066667 | 7/2005 |

OTHER PUBLICATIONS

Japanese Patent Abstract for Publication No. 2004-294668, published Oct. 21, 2004, 12 pages.
Translation of JP 3432507, Publication No. 2004-020736, published Jan. 22, 2004, 19 pages.
International Preliminary Report on Patentability for corresponding PCT/JP2008/061237 mailed Jan. 21, 2010, 14 pages.
International Search Report for corresponding PCT/JP2008/061237 mailed Sep. 22, 2008, three pages.
Supplementary European Search Report dated Jun. 14, 2012, Application No. 08777398, Marujin Co., Ltd. seven pages.
English Abstract from Espacenet of CN 1977190, 2 pages.

incident angle of white linealy light

RETROREFLECTIVE MEMBER PRODUCING IRIDESCENT REFLECTED LIGHT

CROSS-REFERENCE TO RELATED APPLICATIONS

This application is a division of U.S. application Ser. No. 12/665,713, filed May 12, 2010, now U.S. Pat. No. 8,684,544, which application was a U.S. National Stage of International App. Ser. No. PCT/JP2008/061237, filed Jun. 19, 2008, and claims priority to Japanese Patent Application No. JP 2007-161170, filed Jun. 19, 2007.

TECHNICAL FIELD

The present invention relates to retroreflective members, and more specifically, to improvements of retroreflective members using retroreflected light and interference colors of a metal compound.

BACKGROUND ART

Retroreflective members that exhibit clear and desired colors under diffused light conditions and that exhibit sufficient reflected luminance under retroreflection conditions have been proposed (Patent Documents 1 to 3, for instance).

Reflected light from conventional retroreflective members cannot be colored directly, and the reflected light has just a single color. Although the reflected light can be colored by coloring the surface of the reflective member or by bonding a film or the like thereto, it is impossible to display clear and desired colors under diffused light conditions. In addition, the thickness and texture (hardness) of the base member make it hard to produce a desired design.

Patent Document 1: Japanese Patent No. 3432507 (Color retroreflective member)

Patent Document 2: Japanese Unexamined Patent Application Publication No. Hei-11-167010 (Colored-light retroreflective member)

Patent Document 3: Japanese Patent Application Publication No. Hei-10-500230 for PCT International Application (Retroreflective product and manufacturing method thereof)

DISCLOSURE OF INVENTION

Problems to be Solved by the Invention

In recent years, many reflective members have been used and worn, but any reflective members worn and used at nighttime (road signs, reflective plates on pedestrian walkways along roads, work vests, reflective members for apparel) provide similar reflected light that becomes submerged in non-reflected light from road lamps on pedestrian walkways along roads, distant streetlights, and the like. The wearers are not quite noticed, and the visibility to drivers is not enough.

Therefore, an object of the present invention is to provide a retroreflective member that can be converted to any design and shape and can show clear and desired colors under diffused light conditions, and that can exhibit retroreflective performance with improved safety and can enhance visibility at nighttime by adding varying interference colors to the retroreflected light under retroreflection conditions.

To achieve the object, a retroreflective layer having higher reflection performance and an interference color was needed.

The technologies disclosed in Patent Documents 1 to 3 above were studied and found to be unfit for means for solving the problems described above.

The technologies that let reflected light exhibit an interference color under retroreflection conditions include those disclosed in Patent Documents 2 and 3 above.

However, with the technology disclosed in Patent Document 2, reflected light of just a single color can be produced. Also, since the technology disclosed in Patent Document 3 uses a light interference film bonded to a reflective surface, the single-color reflected light passing through the light interference film can provide an interference color, but cannot produce a desired color under diffused light conditions. The thickness and texture of the base member make it difficult to find applications in apparel. Moreover, the reflection performance does not satisfy the requirements of class 1 of JIS Z 9117-1984, and the safety level is not high enough.

Therefore, the technologies disclosed in the Patent Documents listed above could not be applied to provide means for enhancing the visibility of the retroreflective member.

In view of the problems in the related art, it is an object of the present invention to provide a retroreflective member that can improve visibility further.

Means for Solving the Problems

After the inventors studied the performance of the retroreflective member, they have found that iridescent reflected light, which is indispensable to enhance visibility, can be assuredly obtained by setting the optical layer thickness of a light-transmissive interference layer to 100 to 600 nm, and have provided the present invention.

The produced iridescent reflected light has a wavelength component in the visible range emphasized by interference, and the wavelength component in the visible range emphasized by interference varies with the incident angle of light entering the retroreflective member. In general retroreflected light, substantial changes in color depending on the incident angle cannot be observed. The iridescent reflected light of the present invention varies in color with the incident angle. While the incident angle of light entering the retroreflective member is varying under retroreflection conditions, it can be clearly observed that the color of light reflected from the retroreflective member changes iridescently, for example, from orange through red, reddish purple, purple, bluish purple, blue, greenish blue, green, yellowish green, to yellow. The iridescent reflected light of the present invention can be obtained by controlling the optical layer thickness of the interference layer within the range of 100 to 600 nm.

Specifically, to achieve the foregoing object, a retroreflective member according to the present invention includes a reflective layer and transparent microscopic beads, the retroreflective member giving a phase difference corresponding to a visible light wavelength to at least a part of incident light and recombining, emphasizing a light component having the visible light wavelength by interference, and returning coherent light having a visible light wavelength depending on the incident angle in the traveling direction of the incident light; the reflective layer including a light-transmissive interference layer; and the interference layer each having an optical layer thickness of 100 to 600 nm so as to generate an interference color having a visible light wavelength depending on the incident angle of light.

In the present invention, an optical layer thickness of 100 to 600 nm generates the interference color of a first order ($\lambda/4$) or a second order ($3\lambda/4$) of a visible light wavelength. The optical layer thickness of each layer in the interference layer of the present invention is preferably 100 to 600 nm and more preferably 100 to 200 nm.

In the present invention, it is preferred the interference layer be a multilayer interference film formed by alternately depositing a layer of a low-refractive-index metal compound and a layer of a high-refractive-index metal compound having a higher refractive index than the low-refractive-index metal compound, and the optical layer thickness of each metal compound layer forming the multilayer interference film be 100 to 200 nm.

In the present invention, it is preferred that the multilayer interference film include metal compound layers each having a higher refractive index than the transparent microscopic beads, on both sides in the metal compound deposition direction.

This is because more desirable retroreflected light can be obtained when placing metal compound layers having a higher refractive index than the transparent microscopic beads, on both sides in the metal compound deposition direction, than in the other arrangements.

In the present invention, it is preferred that the high-refractive-index metal compound be one material selected from the group consisting of zinc sulfide, titanium dioxide, indium oxide, tin oxide, zirconium dioxide, alumina, and magnesium oxide, and the low-refractive-index metal compound be one material selected from the group consisting of calcium fluoride, magnesium fluoride, sodium fluoride, and silicon dioxide.

In the present invention, it is preferred that the maximum thickness of the total thickness of the multilayer interference film be selected in the optical layer thickness range of 300 to 600 nm.

Specifically, this is because, if the layer thickness is smaller than 300 nm, the interference light becomes dim; and if the layer thickness is larger than 600 nm, a desired interference light may be not obtained or the appearance color may become opaque.

In the present invention, it is especially preferred that the maximum thickness (total thickness) of the multilayer interference film be selected in the optical layer thickness range of 300 to 600 nm. When the optical layer thickness of each layer is within 100 to 200 nm, it can be used in a retroreflective member of the present invention.

In the present invention, it is preferred that the multilayer interference film include a zinc-sulfide layer having an optical layer thickness of 140 nm, a magnesium-fluoride layer having an optical layer thickness of 140 nm, and a zinc-sulfide layer having an optical layer thickness of 140 nm, deposited in that order from the side of light incidence.

In the present invention, it is preferred that the multilayer interference film include a zinc-sulfide layer having an optical layer thickness of 140 nm, a silicon-dioxide layer having an optical layer thickness of 140 nm, and a zinc-sulfide layer having an optical layer thickness of 140 nm, deposited in that order from the side of light incidence.

In the present invention, it is preferred that gradations within the range of 100 to 200 nm be added to the optical layer thickness of each metal compound layer forming the multilayer interference film.

In the present invention, it is preferred that gradations within the range of 100 to 200 nm be added to the optical layer thickness of each metal compound layer forming the multilayer interference film such that the ratio of the optical layer thickness $T_{90}$ when the incident angle of light with respect to the retroreflective member is 90 degrees, the optical layer thickness $T_{75}$ when the incident angle is 75 degrees, the optical layer thickness $T_{60}$ when the incident angle is 60 degrees, the optical layer thickness $T_{45}$ when the incident angle is 45 degrees, and the optical layer thickness $T_{30}$ when the incident angle is 30 degrees satisfies the relationship 1.00:0.95:0.85:0.70:0.50.

In the present invention, it is preferred that the interference layer be a single-layer interference film of a metal compound, and the optical layer thickness of the single-layer interference film be 100 to 600 nm.

Specifically, this is because, if the layer thickness is smaller than 100 nm, the interference light becomes dim; and if the layer thickness is larger than 600 nm, a desired interference light may be not obtained or the appearance color may become opaque.

In the present invention, it is preferred that the metal compound be one material selected from the group consisting of zinc sulfide, titanium dioxide, indium oxide, tin oxide, zirconium dioxide, alumina, magnesium oxide, calcium fluoride, magnesium fluoride, sodium fluoride, and silicon dioxide.

In the present invention, it is preferred that the single-layer interference film be a zinc-sulfide layer having an optical layer thickness of 400 nm.

In the present invention, it is preferred that gradations within the range of 100 to 600 nm are added to the optical layer thickness of the single-layer interference film.

In the present invention, it is preferred that gradations within the range of 100 to 600 nm be added to the optical layer thickness of the single-layer interference film such that the ratio of the optical layer thickness $T_{90}$ when the incident angle of light with respect to the retroreflective member is 90 degrees, the optical layer thickness $T_{75}$ when the incident angle is 75 degrees, the optical layer thickness $T_{60}$ when the incident angle is 60 degrees, the optical layer thickness $T_{45}$ when the incident angle is 45 degrees, and the optical layer thickness $T_{30}$ when the incident angle is 30 degrees satisfies the relationship 1.00:0.95:0.85:0.70:0.50.

In the present invention, it is preferred that the interference layer be provided below the plurality of transparent microscopic beads.

In the present invention, it is preferred that the metal compound layer provided just below the transparent microscopic beads have a higher refractive index than the transparent microscopic beads in the interference layer.

This is because more desirable retroreflected light can be obtained when the metal compound layer provided just below the transparent microscopic beads has a higher refractive index than the transparent microscopic beads in the interference layer, than when the refractive index is not taken into account.

In the present invention, it is preferred that a colored layer and a colorless transparent layer be provided below the interference layer and above the transparent microscopic beads.

In the present invention, it is preferred that a colored layer, a colorless transparent layer, and a base member bonding adhesive layer be provided below the interference layer.

Functions

A retroreflective member of the present invention has a reflective layer that includes a light-transmissive interference layer, and the optical layer thickness of the interference layer is set to 100 to 600 nm, so that iridescent reflected light can be obtained.

In a first aspect of the present invention, a transmissive layer of one metal compound and a transmissive layer of another metal compound form a multilayer interference film having an odd multiple of the optical layer thickness ($\lambda/4$), and this film is used as the reflective layer.

According to this first aspect of the present invention, because the reflective layer contains transmissive metal compounds, colors of a design or the like on a material or a colored layer below the reflective layer can be seen through the upper reflective layer, under diffused light conditions. Under retroreflection conditions, a part of light entering from above is reflected by the reflective layer and produces retroreflection. Since the reflective layer consists of layers of different types of metal compounds, the differences in refractive index among the layers (odd multiple of $\lambda/4$) cause a part of the incident light to retroreflect in the interference colors of the metal compounds. Resultant visual effects are: The reflected light can be colored; and since the interference colors of the metal compounds change with variations in the incident angle of light, the reflected light also changes to iridescent interference light.

In this first aspect of the present invention, it is preferred that one metal compound and another metal compound be selected such that the difference in refractive index in the visible range is about 0.2 or greater, more preferably about 0.3 or greater. For example, a retroreflective member is formed by using a high-refractive-index compound having a refractive index of 1.74 or greater as one metal compound and a low-refractive-index compound having a refractive index of 1.46 or smaller as the other metal compound. The visual effects of coloring the reflected light and changing it to iridescent interference light can be increased by increasing the difference in refractive index, as described here. It is preferable to deposit three or more layers.

A retroreflective sheet of a second aspect of the invention can be formed by using the base member of the first aspect and providing a multicolor printed design or the like and an adhesive layer below the reflective layer. A retroreflective label having a desired design and shape can be created.

According to the first aspect of the present invention, the retroreflective member can be converted to a desired design or shape, can display clear and desired colors under diffused light conditions, can exhibit retroreflection performance with improved safety under retroreflection conditions, and can enhance visibility at nighttime by adding varying interference colors to the retroreflected light.

According to a third aspect of the present invention, the retroreflective member has a light-transmissive single-layer metal compound layer as the reflective layer and retroreflects at least a part of incident light coming from above, almost in the incident direction. The retroreflective member uses an interference color depending on the thickness of the single-layer metal compound layer.

The metal-compound reflective layer in the third aspect differs from the multilayer interference film in the first aspect in that it uses the intrinsic interference color of the metal compound, and the reflective layer has varying deposition thickness.

The metals useful in the invention (high- and low-refractive index metals) do not include aluminum, which is most commonly used as a reflective layer of a retroreflective member, because aluminum is readily deposited on a projected part (nearest part) and drips little, in the vapor deposition step. Because of these properties, the metal compound or the like is deposited on transparent microscopic bead sheeting, which is the deposition base member. Therefore, the metal compound is deposited thickly in the upper part of the transparent microscopic beads and thinly in the side of the transparent microscopic beads. Consequently, a retroreflective member having an egg-shaped metal-compound reflective layer can be created along the transparent microscopic beads.

A retroreflective sheet of a fourth aspect of the invention can be formed by using the base member of the third aspect of the invention and providing a multicolor printed design or the like and an adhesive layer below the reflective layer. A retroreflective label having a desired design and shape can be created.

According to the third aspect of the present invention, the retroreflective member can be converted to a desired design or shape, can display clear and desired colors under diffused light conditions, can exhibit retroreflection performance with improved safety under retroreflection conditions, and can enhance visibility at nighttime by adding varying interference colors to the retroreflected light.

According to various embodiments of the present invention, a high-refractive-index compound is one material selected from the group consisting of zinc sulfide, titanium dioxide, indium oxide, tin oxide, zirconium dioxide, alumina, and magnesium oxide.

A low-refractive-index compound is one material selected from the group consisting of calcium fluoride, magnesium fluoride, sodium fluoride, and silicon dioxide. These metal compounds are deposited on the surfaces of transparent microscopic beads or the like by vapor deposition, sputtering, and other methods, and the deposited layers can be used as a reflective layer. Therefore, a retroreflective member that reflects light having interference colors can be manufactured. Even if a single layer of a metal compound is deposited with an eye to economy and durability, a similar retroreflective member that reflects light having an interference color can be manufactured.

The refractive index of light of each metal compound in the visible range depends on the wavelength $\lambda$ of light, and the values are generally as follows.

High-Refractive-Index Compounds
Zinc sulfide (ZnS): 2.40
Titanium dioxide ($TiO_2$), rutile: 2.71, anatase: 2.52
Indium oxide ($In_2O$, $In_2O_3$): 2.00
Tin oxide (SnO, $SnO_2$): 1.90
Zirconium dioxide ($ZrO_2$): 2.40
Alumina (aluminum oxide, $Al_2O_3$): 1.76
Magnesium oxide (MgO): 1.74
Low-refractive-index compounds
Calcium fluoride ($CaF_2$): 1.44
Magnesium fluoride ($MgF_2$): 1.38
Sodium fluoride (NaF): 1.29
Silicon dioxide ($SiO_2$): 1.46

According to a fifth aspect of the present invention, it is preferred that the maximum thickness of the entire reflective layer be within the range of 300 to 600 nm in order to ensure an interference color of reflected light in a wide range of angles while balancing the required reflection luminance rate with light transmittance. The thickness of each deposition layer can be selected as desired, preferably an odd multiple of the optical layer thickness, $\lambda/4$, used in reflection enhancement films and antireflection films.

According to a sixth aspect of the present invention, it is preferred that the maximum thickness of the reflective layer be within the range of 300 to 600 nm in order to ensure an interference color of reflected light in a wide range of angles while balancing the required reflection luminance rate with light transmittance. In the preferable shape of the deposition layer, the reflective layer can be evenly parallel along the transparent microscopic beads for reflection and refraction, but a structure that varies the thickness of the deposition layer is especially preferred to emphasize the interference color.

A retroreflective member according to a seventh aspect of the present invention has an interference-color reflective layer of several aspects of the invention in the positions of the refractive focal points of reflected light below the plurality of evenly distributed transparent microscopic beads.

A colored layer in the second aspect of the present invention is disposed below the interference layer and can be converted to a desired design and shape and can display clear and desired colors under diffused light conditions. If the colored layer is a colorless transparent layer, a bonded material or a design and colors on the surface of the material can be visually recognized from above the transparent microscopic beads, and a retroreflective member that has enhanced visibility at nighttime and that exhibits retroreflective performance with improved safety under retroreflection conditions can be provided by adding varying interference colors to the retroreflected light.

A desired design and shape can also be created above the transparent microscopic beads (on the reflective surface) and clear and desired colors can also be displayed. However, they disturb (or refract) incident light, making it impossible to obtain retroreflected light. Therefore, it is advisable to color a part of a design or letters and avoid front printing on the transparent microscopic beads (on the reflective surface).

A retroreflective member according to the fourth aspect of the present invention has a desired design or the like colored on a reflective member having an interference layer in its reflective layer, as in several aspects of the invention, and has an adhesive layer to be stuck to a bonding base member (film, fabric, signboard, etc.). Retroreflective labels and logos that allow a desired design, shape, and colors to be created by printing (screen printing, offset printing, gravure printing, etc.) on the colored layer and adhesive layer can be provided.

The type of the retroreflective members of the present invention is not especially limited. Besides the open type (the transparent microscopic beads are exposed), a closed type (the transparent microscopic beads are buried), an embossed cube type (microprisms), and the like are provided. The same reflected light can be obtained even if the interference layer is placed at positions of lower reflective focal points.

Advantages of the Invention

A retroreflective member of the present invention has a light-transmissive interference layer, and the optical layer thickness of the interference layer is set to 100 to 600 nm. According to the present invention, highly visible iridescent reflected light can be assuredly produced, and consequently, the visibility can be improved further.

More specifically, it becomes possible to provide a retroreflective member that can be converted to any design or shape, can show clear and desired colors under diffused light conditions, can exhibit retroreflective performance with improved safety under retroreflection conditions, and can enhanced visibility at nighttime by adding varying interference colors to the retroreflected light. Because the reflected light differs from reflected light produced by widely used general reflective members or light produced by road lamps on pedestrian walkways along roads, distant streetlights, and other non-reflective-member sources, the visibility to drivers can be improved.

BEST MODE FOR CARRYING OUT THE INVENTION

Embodiments preferred for carrying out the retroreflective member according to the present invention and examples thereof will be described below. The description below is given to promote deep understanding of the present invention but not to confine the scope of the claims.

First Embodiment

FIG. 1 is an enlarged sectional view showing the structure of a retroreflective member according to a first embodiment of the present invention. In FIG. 1 and other drawings, for the sake of convenience in illustration, just a portion of the retroreflective member extending in a planar direction is drawn such that it has an uninterrupted regular arrangement of glass beads and has layers each with an even thickness in the direction in which the planar layer extends. The dimensions of the glass beads and the thickness of each layer are not always illustrated at an accurate ratio with respect to the thickness of a different layer, and the thickness is sometimes increased or decreased for the sake of description.

In FIG. 1, the retroreflective member has a layer structure that includes a base layer 11, a covering layer 12, glass beads (transparent microscopic beads) 13, a multilayer interference film (interference layer) 14, a colored resin layer (colored layer) 16, and an adhesive resin layer (adhesive layer) 21, in that order from the top.

The retroreflective member is stuck to a target surface 22, such as film, fabric, and hot melt film.

The base layer 11 is made of resin film or paper. When in use, the base layer 11 and the lower covering layer 12 are stripped off together from the retroreflective member and become an open-type retroreflective member (with the glass beads exposed), as shown in a left-part portion of FIG. 1. The covering layer 12 is a layer of colorless, transparent resin such as polyethylene.

The glass beads 13 are placed side by side below the covering layer 12. Glass beads having a refractive index of about 1.9 are selected as the glass beads 13. A refractive index of 1.92 and a bead diameter of 38 to 50 µm or 50 to 85 µm are preferred here. The position of the refractive focal point of the glass beads 13 corresponds to the lower hemispherical surface of the glass beads 13. The multilayer interference film 14 is made of an interference metal compound deposited on the bottom surface of the glass beads 13 (or on the surface of the covering layer 12 in a gap between adjacent glass beads 13) and has three deposited layers: 140 nm (optical layer thickness) of zinc sulfide, 140 nm (optical layer thickness) of silicon dioxide, and 140 nm (optical layer thickness) of zinc sulfide. It is preferred that the optical layer thickness of each deposited metal-compound layer be an odd multiple of a quarter, especially $1/4$ or $3/4$, of a visible wavelength of 400 to 800 nm.

As shown in FIG. 1, a reflective colored resin layer 19, the colored resin layer 16, and a transparent resin layer (transparent layer) 20 are printed below the multilayer interference film 14. When the reflective colored resin layer 19 and the colored resin layer 16 have unrelated colors or related colors, they can be used to produce a visually recognizable pattern under diffused light conditions or to produce a visually recognizable pattern under reflected light. Even if the transparent resin layer 20 is added, the same can be confirmed visually, and the texture, colors, and the like of the target surface 22 can also be viewed. The present embodiment has the reflective colored resin layer 19, the colored resin layer 16, and the transparent resin layer 20, but it is needless to say that only any one of the reflective colored resin layer 19, the colored resin layer 16, and the transparent resin layer 20 can be used instead. If the reflective colored resin layer 19 and the colored resin layer 16 have pale colors, those colors would be mixed with the color of the target surface 22. A resin layer with pulverized titanium dioxide or the like can be provided below the reflective colored resin layer 19 and the colored resin layer 16 to avoid color mixing.

The adhesive resin layer 21 is disposed below the reflective colored resin layer 19, the colored resin layer 16, and the transparent resin layer 20. The adhesive resin layer 21 is a layer provided to stick the retroreflective member onto the target surface 22. When the adhesive resin layer 21 is hot melt film or an adhesive sticker, bonded release paper (not shown) should be peeled off before affixing.

An upper colored resin layer resin layer 17 is a layer of colored resin, transparent resin, or the like. The layer does not produce reflected light, and its color can be confirmed visually under diffused light conditions. However, if the ratio of the upper colored resin layer resin layer 17 is large with respect to the surface area of the retroreflective member, the visibility of reflected light decreases. When transparent resin is used, the coloring (below the glass beads) can be confirmed visually through the transparent resin under diffused light conditions, and the upper colored resin layer resin layer 17 blocks reflected light under retroreflection conditions. Therefore, hidden letters, a design, and other special features can be created.

A feature of the present invention is as follows: Part of incident light is given a phase difference corresponding to a visible light wavelength and recombined; a light component of the visible light wavelength is emphasized by interference; and coherent light having a visible light wavelength depending on the incident angle is returned in the traveling direction of the incident light.

Accordingly, the reflective layer includes a light-transmissive interference layer, and the optical layer thickness of the interference layer is set to 100 to 600 nm, so that an interference color having a visible light wavelength depending on the incident angle occurs.

In the present embodiment, the multilayer interference film 14 is provided on the surface of the colored resin layer 16 where the glass beads 13 are buried. The metal compounds constituting the multilayer interference film 14 of the present embodiment have an optical layer thickness of 100 to 600 nm each across the whole range of positions of the lower reflective focal points of the glass beads 13.

Regarding the total thickness of the multilayer interference film 14 in the present embodiment, the maximum thickness in the range of optical layer thickness of 300 to 600 nm is selected.

If the maximum thickness of the multilayer interference film 14 is smaller than an optical layer thickness of 300 nm, coherent light becomes dim. If the maximum thickness is greater than an optical layer thickness of 600 nm, the appearance color may become opaque, or desired coherent light may not be obtained.

It is especially preferred that each layer in the multilayer interference film 14 have an optical layer thickness of 100 to 200 nm.

The high-refractive-index metal compound in the present embodiment is one material selected from the group consisting of zinc sulfide, titanium dioxide, indium oxide, tin oxide, zirconium dioxide, alumina, and magnesium oxide. The low-refractive-index metal compound is one material selected from the group consisting of calcium fluoride, magnesium fluoride, sodium fluoride, and silicon dioxide.

Since the interference layer in the present embodiment includes multiple layers, the same interference color occurring in an upper layer occurs also in a lower layer. Because the interference color is emphasized, it matches the desired interference color more.

Second Embodiment

The basic structure in FIG. 2 is the same as that shown in FIG. 1, but it is also preferable to use a single-layer interference film 15, as means for reducing the cost and loss rate in comparison with the multilayer interference film 14.

The single-layer interference film (interference layer) 15 is a single layer of a high-refractive-index metal compound (e.g., one material selected from the group consisting of zinc sulfide, titanium dioxide, indium oxide, tin oxide, zirconium dioxide, alumina, and magnesium oxide) or a low-refractive-index metal compound (e.g., one material selected from the group consisting of calcium fluoride, magnesium fluoride, sodium fluoride, and silicon dioxide) or a metal compound (e.g., zinc-sulfide layer having an optical layer thickness of 400 nm). This interference film 15 is a reflective layer using interference, its thickness can change, and an interference color can be obtained also from interference with the metal compound. Since the metal compound has such properties that the evaporated compound is readily deposited on a projected part of the deposition face and does not easily drip, it can form the single-layer interference film 15 having varying thickness by depositing it not on a flat face such as film but on glass bead sheeting (the base layer 11, the covering layer 12, and the glass beads 13). It is needless to say that the degree of vacuum, temperature, and time of vapor deposition of the single-layer interference film 15 depend on the high-refractive-index metal compound or low-refractive-index metal compound used.

Accordingly, the single-layer interference film 15 is a single layer of a high-refractive-index metal compound or a low-refractive-index metal compound and is also an interference layer causing variations in the deposited layer thickness. Here, zinc sulfide is deposited with temperature, time, and deposition angle specified to bring the highest (maximum) geometrical layer thickness to 180 nm and the lowest (minimum) geometrical layer thickness to 120 nm. The reflective colored resin layer 19, the colored resin layer 16, the transparent resin layer 20, the adhesive resin layer 21, and the like can be provided under the single-layer interference film 15, in the same way as shown in FIG. 1.

A feature of the present embodiment is that the single-layer interference film 15 is provided on the surface of the colored resin layer 16 where the glass beads (transparent microscopic beads) 13 are buried.

The single-layer interference film 15 of the present embodiment has an optical layer thickness of 100 to 600 nm across the whole range of positions of the lower reflective focal points of the glass beads 13.

If the optical layer thickness of the single-layer interference film 15 is smaller than 100 nm, coherent light becomes dim. If the optical layer thickness is greater than 600 nm, the appearance color may become opaque. That is, desired coherent light may not be obtained.

Third Embodiment

FIG. 3 is a view showing the structure of an embodiment using a retroreflective member according to the present invention. A base member 23 includes the base layer 11, the covering layer 12, and the glass beads 13. The reflective colored resin layer 19, the colored resin layer 16, the transparent resin layer 20, and the adhesive resin layer 21 are silk-screen-printed in a desired design and shape on a part of the base member 23. The face of the adhesive resin layer 21 is stuck to a target surface 25, and the base member 23 is peeled off. Then, a transfer image 24, including the glass beads 13, the reflective colored resin layer 19, the colored resin layer 16, the transparent resin layer 20, and the adhesive resin layer 21, silk-screen-printed in the desired design and shape, is stuck to the target surface 25.

When the reflective colored resin layer 19 and the colored resin layer 16 have unrelated colors or related colors, they can be used to produce a visually recognizable pattern under diffused light conditions or to produce a visually recognizable pattern under reflected light. Even if the transparent resin layer 20 is added, the same can be confirmed visually, and the texture, colors, and the like of the target surface 25 can be viewed. The present embodiment has the reflective colored resin layer 19, the colored resin layer 16, and the transparent resin layer 20, but it is needless to say that only any one of the reflective colored resin layer 19, the colored resin layer 16, and the transparent resin layer 20 can be used instead. If the reflective colored resin layer 19 and the colored resin layer 16 have pale colors, those colors would be mixed with the color of the target surface 25. A resin layer with pulverized titanium dioxide or the like can be provided below the reflective colored resin layer 19 and the colored resin layer 16 to avoid color mixing.

The adhesive resin layer 21 can be hot melt resin for heat transfer, pressure-sensitive gluing resin, adhesive resin, or the like, and a suitable resin for the target surface can be selected. Therefore, heat transfer labels, adhesive stickers, appliqué, and other retroreflective members requiring design or letters can be created.

By using the interference reflective layer of the present invention in the positions of the lower reflective focal points of embossed cubes (microprisms) or closed-type retroreflective members (with buried glass beads), which are other retroreflective members, the same iridescent reflected light can be obtained, although such a case is not shown in the figure. However, those two types of retroreflective members have a film-type reflective base layer and require cutting and fusion bonding by a high-frequency welder or the like to form a desired logo or letters. They can be used on road signs, safety clothing, security vests, and other things that would use the member on the whole surface.

Examples of retroreflective members producing iridescent reflected light according to the present invention will be described below.

First Example

A base member 1 was formed as follows: A covering layer about 25 μm thick was formed on the upper surface of a 100 μm thick base PET film (EMBLET (trademark)) by applying silicone-mixed polyethylene resin (5150S (trademark)) with a Comma Coater; on the covering layer, glass beads (UB-13M (trademark)) with a refractive index of 1.92 and a diameter of 38 to 53 μm were distributed; it was dried by heat at 100° C. for about six minutes to embed the lower half of the glass beads into the polyethylene resin; further, on the upper surface (of the glass bead face), a multilayer interference film 14 was formed by depositing zinc sulfide to a thickness of 140 nm, magnesium fluoride to a thickness of 140 nm, and zinc sulfide to a thickness of 140 nm with vapor deposition equipment.

A base member 2 was formed as follows: A multilayer interference film 14 was formed by depositing zinc sulfide to a thickness of 140 nm, silicon dioxide to a thickness of 140 nm, and zinc sulfide to a thickness of 140 nm.

A base member 3 was formed as follows: A multilayer interference film 14 was formed by depositing zinc sulfide to a thickness of 165 nm, silicon dioxide to a thickness of 137 nm, zinc sulfide to a thickness of 165 nm, silicon dioxide to a thickness of 137 nm, and zinc sulfide to a thickness of 165 nm.

To check the appearance colors of the base members 1, 2, and 3 and the multilayer interference film 14, retroreflective members each producing single-color iridescent reflected light (retroreflective members each with a fully-colored reflective layer) were obtained as follows: A reflective colored resin layer made of a mixture consisting of, by weight, 65% polyurethane resin (AG-946HV (trademark)), 20% pearl pigment (Pearl Glaze MF-100R (trademark)), 1% color pigment (K Color K603 (trademark)), 5% hardener (ACCEL HM (trademark)), and 9% solvent (toluene) was applied on the multilayer interference film face of each base member with the Comma Coater at an applying rate of two meters per minute, with a gap width of 200 μm, and was dried by hot air at 70° C., 90° C., or 120° C.

Second Example

A single-layer interference film 15 was formed of a single metal compound to reduce the cost and production loss rate.

A base member 4 was formed as follows: A covering layer about 25 μm thick was formed on the upper surface of a 100 μm thick base PET film (EMBLET (trademark)) by applying silicone-mixed polyethylene resin (5150S (trademark)) with a Comma Coater; on the covering layer, glass beads (UB-13M (trademark)) with a refractive index of 1.92 and a diameter of 38 to 53 μm were distributed; it was dried by heat at 100° C. for about six minutes to embed the lower half of the glass beads into the polyethylene resin; further, on the upper surface (of the glass bead face), zinc sulfide was deposited up to the maximum deposition layer thickness of 240 nm with vapor deposition equipment.

By the same method as described above, zinc sulfide of up to the maximum deposition layer thickness of 360 nm (base member 5), zinc sulfide of up to the maximum deposition layer thickness of 432 nm (base member 6), and zinc sulfide of up to the maximum deposition layer thickness of 600 nm (base member 7) were deposited to form a single-layer interference film 15.

As in the first example, retroreflective members each producing single-color iridescent reflected light (retroreflective members each with a fully-colored reflective layer) were obtained as follows: A reflective colored resin layer made of a mixture consisting of, by weight, 65% polyurethane resin (AG-946HV (trademark)), 20% pearl pigment (Pearl Glaze MF-100R (trademark)), 1% color pigment (K Color K603 (trademark)), 5% hardener (ACCEL HM (trademark)), and 9% solvent (toluene) was applied on the base members 4, 5, 6, and 7 with the Comma Coater at an applying rate of two meters per minute, with a gap width of 200 μm, and was dried by hot air at 70° C., 90° C., or 120° C.

The reflective base member films in which the interference layers were made in the first and second examples were colored. The appearance colors (under diffused light conditions), changes in reflected light interference color (under retroreflection) depending on the angle, and the reflected luminance, which is required most in retroreflective members, were observed. The results are shown in Table 1.

TABLE 1

| | | Appearance color (Under diffused light) | Reflected light color (under retroreflection) | | | Reflection luminance rate JIS Z 9117-1984 |
|---|---|---|---|---|---|---|
| | | | Incident angle (5°) | Incident angle (30°) | Incident angle (60°) | |
| First example | Base member 1 | Same as applied color | Yellowish interference color | Bluish interference color | Pinkish interference color | 90 cdl/xm² |
| | Base member 2 | Same as applied color | Yellowish interference color | Bluish interference color | Pinkish interference color | 90 cdl/xm² |
| | Base member 3 | Opaque | Yellowish to greenish interference color | Bluish to purplish interference color | Purplish to reddish interference color | 100 cdl/xm² |
| Second example | Base member 4 | Same as applied color | Yellowish to pale greenish interference | | | 50 cdl/xm² |
| | Base member 5 | Same as applied color | Yellowish through greenish to bluish interference | | | 70 cdl/xm² |
| | Base member 6 | Slightly opaque | Yellowish interference color | Bluish interference color | Pinkish interference color | 90 cdl/xm² |
| | Base member 7 | Slightly opaque | Yellowish through greenish to yellowish interference | | | 90 cdl/xm² |

*The reflection luminance rate (conforming to JIS Z 9117-1984) in Table 1 was at an observation angle of 0.2° and an incident angle of 5°.

As shown in Table 1, the desired appearance colors could be produced, and the reflected interference colors had transparency. However, as the deposition thickness increased, the given appearance colors became slightly opaque. Since the reflection luminance rate conformed to class 1, 70 cdl/xm², and class 2, 35 cdl/xm², of the JIS Z 9117-1984 standard, it was confirmed that the products had highly safe reflection performance.

Unlike ordinary reflected light, the reflected light caused by the multilayer interference films 14, as in the first example, produced the desired reflected light colors by interference. If more layers were deposited, a wider variety of reflected interference colors would be produced, depending on the angle, and more interference colors could be obtained. As the results of the second example listed in Table 1 indicate, coherent light can be obtained even with the single-layer interference films 15. It was found that when the film was thin, the coherent light was dim, and when the film was too thick, desired coherent light could not be obtained (analogous to reflected light from a thin film).

Therefore, as retroreflective members producing iridescent reflected light according to the present invention, the base member 1 and base member 2 of the first example and the base member 6 of the second example are suitable because they can produce the desired appearance color and reflected light color and have the desired reflection performance collectively. In terms of reflected light (interference color) alone, the base member 3 of the first example is most suitable.

Third Example

The base members 1, 2, and 3 of the first example and the base member 6 of the second example were selected as retroreflective films producing iridescent reflected light, and the next topics, which are the design and shape, were verified.

To verify the design, colors, shape, and properties, a heat transfer label was created by silk-screen-printing letters and a pattern and by copperplate-printing thermal adhesive resin for bonding with the target surface. Colors were verified by producing white (pale color), black (dark color), and transparent color.

The upper surfaces of the reflective layers of the base members 1, 2, 3, and 6 were silk-screen-printed. Two stencils A and B were created by using a 150 mesh. With stencil A, resin of a colored reflective layer was made of a mixture consisting of, by weight, 65% polyurethane resin (AG-946HV (trademark)), 20% pearl pigment (Pearl Glaze MF-100R (trademark)), 1% color pigment (K Color K208 (black)), 5% hardener (ACCEL HM (trademark)), and 9% solvent (toluene). Printing was performed with the thickness of the printing layer set to 50 μm. The print was dried. The process for other colors (white) was the same, but in the process for the transparent color, the pearl pigment and the color pigment were excluded. Single-color printing is described here, but needless to say, multicolor printing and a blocking layer can be added.

With stencil B, thermal adhesive resin was made of a mixture consisting of, by weight, 60% polyurethane resin (AG-865HV (trademark)), 20% pulverized melt powder (P906 (trademark)), and 20% solvent (CHA). Printing was performed with the thickness of the printing layer set to 50 μm, and a heat transfer label was created. The label was pressed against the target surface at a press temperature of 150° C. and a pressure of 500 g/cm² for ten seconds. After it became cold, the base PET liner was peeled off, and the label was stuck properly at a press temperature of 150° C. and a pressure of 500 g/cm² for fifteen seconds.

The resultant appearance colors and reflected light colors of the base members, depending on coloring, are listed in Table 2, and the results of property tests conducted on the base members are listed in Table 3.

TABLE 2

| | | White color | | Black color | | Transparence | |
|---|---|---|---|---|---|---|---|
| | | Appearance color | Reflected light color | Appearance color | Reflected light color | Appearance color | Reflected light color |
| First example | Base member 1 | Same as applied color | Same as Table 1 | Visible interference color | Same as Table 1 | Object color | Same as Table 1 |
| | Base | Same as | Same as | Visible | Same as | Object | Same as |

TABLE 2-continued

|  |  | White color | | Black color | | Transparence | |
|---|---|---|---|---|---|---|---|
|  |  | Appearance color | Reflected light color | Appearance color | Reflected light color | Appearance color | Reflected light color |
|  | member 2 | applied color | Table 1 | interference color | Table 1 | color | Table 1 |
|  | Base member 3 | Slightly yellowish color | Same as Table 1 | Sharp interference color | Same as Table 1 | White object color | Same as Table 1 |
| Second example | Base member 6 | Same as applied color | Same as Table 1 | Visible interference color | Same as Table 1 | Object color | Same as Table 1 |

TABLE 3

|  |  | Coloring (white) | | Coloring (black) | | Coloring (transparent) | |
|---|---|---|---|---|---|---|---|
|  | Item | Fading and discoloring (class) | Change in appearance | Fading and discoloring (class) | Change in appearance | Fading and discoloring (class) | Change in appearance |
| Base member 1 | Water wash resistance (method 103) | 2 | Interference color destroyed | 2 | Interference color destroyed | 2 | Interference color destroyed |
|  | Dry cleaning resistance (method 401) | 4 to 5 | Not changed | 4 to 5 | Not changed | 4 to 5 | Not changed |
|  | Dry cleaning resistance (method 402) | 4 to 5 | Not changed | 4 to 5 | Not changed | 4 to 5 | Not changed |
|  | Rub resistance Water washing | Several beads came off | | Several beads came off | | Several beads came off | |
|  | Dry cleaning | Not changed | | Not changed | | Not changed | |
| Base member 2 | Water wash resistance (method 104) | 3 to 4 | Several came off | 3 to 4 | Several came off | 3 to 4 | Several came off |
|  | Dry cleaning resistance (method 403) | 4 to 5 | Not changed | 4 to 5 | Not changed | 4 to 5 | Not changed |
|  | Dry cleaning resistance (method 404) | 4 to 5 | Not changed | 4 to 5 | Not changed | 4 to 5 | Not changed |
|  | Rub resistance Water washing | Several beads came off | | Several beads came off | | Several beads came off | |
|  | Dry cleaning | Not changed | | Not changed | | Not changed | |
| Base member 3 | Water wash resistance (method 105) | 2 | Beads came off | 2 | Beads came off | 2 | Beads came off |
|  | Dry cleaning resistance (method 405) | 4 to 5 | Not changed | 4 to 5 | Not changed | 4 to 5 | Not changed |
|  | Dry cleaning resistance (method 406) | 4 to 5 | Not changed | 4 to 5 | Not changed | 4 to 5 | Not changed |
|  | Rub resistance Water washing | Beads came off | | Beads came off | | Beads came off | |
|  | Dry cleaning | Not changed | | Not changed | | Not changed | |
| Base member 6 | Water wash resistance (method 106) | 3 to 4 | Several came off | 3 to 4 | Several came off | 3 to 4 | Several came off |
|  | Dry cleaning resistance (method 407) | 4 to 5 | Not changed | 4 to 5 | Not changed | 4 to 5 | Not changed |
|  | Dry cleaning resistance (method 408) | 4 to 5 | Not changed | 4 to 5 | Not changed | 4 to 5 | Not changed |
|  | Rub resistance Water washing | Several beads came off | | Several beads came off | | Several beads came off | |
|  | Dry cleaning | Not changed | | Not changed | | Not changed | |

Properties were tested in terms of reflective performance, reflective interference light, appearance color, and durability when used for clothing.

Water wash resistance test (JIS-L-0217, method 103): 50 cycles of washing; drying by thermostatic drier (60° C.×30 minutes)

Dry cleaning resistance test (JIS-L-0217, method 401): Perchlorethylene; ten cycles Dry cleaning resistance test (JIS-L-0217, method 402): Petroleum based; ten cycles Rub resistance test (JIS-L-0849): Type-II rub resistance tester; applied load of 500 gf; 200 rub cycles The results in Table 2 indicate that when the colored layer had a dark color, the interference colors were seen in the appearance color, and the desired appearance color was not obtained. The results in Table 3 indicate that since magnesium fluoride contained as a part of the multilayer interference film of the base member 1 dissolved in water and destroyed the refraction layer, the interference color could not be obtained in the reflected light, and common yellowish reflected color was obtained. In the base member 3, which had the multilayer interference film, adhesion between the metal compound and glass beads was poor, and beads came off in the water wash resistance test.

According to the results, the base member 2 of the first example and the base member 6 of the second example are the most suitable as base members used as retroreflective members producing iridescent reflected light. If the member is used in a product that would not be water-washed, the base member 3, having the highest interference reflection, may also be selected. It can be judged from the test results that the performance and properties are adequate as those required in practical clothing.

Fourth Example

The base member 6 of the second example was used to check applications for other products. Although the base member 6 was used here, needless to say, the base member 2 or 3 can be used in the same way. The colored layer of transparent resin was used and bonded with target surfaces of 25-μm PET film, polyester fabric, and hot melt film. The 25-μm PET film was bonded to a double-sided reflective member, slit by a micro-slitter into reflective single yarns of 0.275 mm, 0.5 mm, and 0.75 mm, and woven into textiles, knitted goods, tapes, and the like. The polyester fabric (plain) was slit into strips of 0.75 mm, 1 mm, and 3 mm and woven into textiles and garment attachment tapes. The hot melt film was slit into strips of 2 mm, 5 mm, and 10 mm and thermally transferred to garment attachment tapes and the like.

The result was that the interference color of reflected light did not occur with a slit product width of 0.75 mm or below. However, an assembled part produced normal reflected interference color. The garment attachment tape using the slit polyester fabric was dyed and tested. With the dyed polyester fabric, reflective yarn of a related color for piece dyeing was made. The resultant appearance color was as shown in Table 2, and the interference color was seen in the appearance color if the color was dark. The results of the hot melt film were as shown in Tables 2 and 3.

Embodiments and examples of the present invention have been described above, but the present invention should not be confined by the embodiments and examples. Needless to say, modifications can be made within the scope of the present invention.

Improving Visibility Further

To improve the visibility of the retroreflective members further in the examples, it is very important to improve the appearance color under diffused light conditions, the reflected light color under retroreflection conditions, and the reflective performance comprehensively. For that purpose, the optical layer thickness setting of the interference films is very important.

To check the relationship between the optical layer thickness of the interference films and the performance of the retroreflective members, the appearance color, reflected light color, and reflective performance were observed while varying the optical layer thickness (entire thickness) of the interference films.

Test Method

◎: very good
○: good
Δ: passably good
X: bad (1) Multilayer Interference Film

In this test, to check the relationship between the optical layer thickness of the multilayer interference film 14 and the performance, the appearance color, reflected light color, and reflective performance were observed while varying the optical layer thickness (entire thickness) of the multilayer interference film. The results are listed in Table 4.

TABLE 4

| Optical layer thickness (nm) | 250 | 300 | 350 | 400 | 450 | 500 | 550 | 600 | 650 |
|---|---|---|---|---|---|---|---|---|---|
| Visible of appearance color | ◎ | ◎ | ◎ | ◎ | ○ | ○ | Δ | Δ | X |
| Changing refrected light color | X | Δ | ○ | ◎ | ◎ | ○ | ○ | Δ | X |
| Property of reflected light (brightness) | Δ | Δ | ○ | ◎ | ◎ | ◎ | ◎ | ◎ | ◎ |

As shown in the table, when the optical layer thickness (entire thickness) of the multilayer interference film 14 was smaller than 300 nm, the coherent light was dim, and the desired interference color could not be obtained in some cases.

In some other cases, when the optical layer thickness (entire thickness) of the multilayer interference film 14 was greater than 600 nm, the desired coherent light could not be obtained, or the appearance color became opaque, and therefore an interference color could not be obtained.

It is concluded from the results that the optical layer thickness (entire thickness) of the multilayer interference film 14 should be selected within the range of 300 to 600 nm in the examples.

Retroreflective members having such a multilayer interference film 14 can provide appearance color, reflected light color, and reflective performance at an extremely high level in good balance.

(2) Single-Layer Interference Film

To check the relationship between the optical layer thickness of the single-layer interference film 15 and the performance, the appearance color, reflected light color, and reflective performance were observed while varying the optical layer thickness of the single-layer interference film 15. The results are listed in Table 5.

TABLE 5

| Optical layer thickness(nm) | 50 | 100 | 200 | 300 | 400 | 500 | 600 | 700 |
|---|---|---|---|---|---|---|---|---|
| Visible of appearance color | ◎ | ◎ | ◎ | ◎ | ○ | ○ | △ | △ |
| Changing reflected light color | X | △ | △ | ○ | ◎ | ◎ | △ | X |
| Property of reflected light (brightness) | X | △ | △ | ○ | ◎ | ◎ | ◎ | ◎ |

As shown in the table, when the optical layer thickness of the single-layer interference film 15 was smaller than 100 nm, the coherent light was dim, and the desired interference color could not be obtained in some cases.

In some other cases, when the optical layer thickness of the single-layer interference film 15 was greater than 600 nm, the desired coherent light could not be obtained, or the appearance color became opaque, and therefore an interference color could not be obtained.

It is concluded from the results that the optical layer thickness of the single-layer interference film 15 should be selected within the range of 100 to 600 nm in the examples.

Retroreflective members having such a single-layer interference film 15 can provide appearance color, reflected light color, and reflective performance at an extremely high level in good balance.

Improving Visibility Further

To improve the visibility further in the examples, it is very important to increase further the variety of reflected light colors. Therefore, it is especially preferred to add gradations to the optical thickness of the interference films within the range of 100 to 600 nm, so that the optical thickness of the interference films depends on the incident angle.

Production Method

The method of producing gradations will be described with reference to FIG. 4. The figure is illustrated for an open-type retroreflective member. The structure is simplified for convenience of illustration.

The gradation production method shown in the figure includes a thin layer deposition step (FIG. 4(A)), a film base member bonding step (FIG. 4(B)), and a protection film removal step (FIG. 4(C)).

In the thin layer deposition step shown in FIG. 4(A), a thin ZnS film is deposited on original bead sheeting (glass beads) 13 held by a protection film 30. The uneven surface produced by the hemispherical shapes of the glass beads 13 gives gradations to the thickness of the thin ZnS film, decreasing the thickness from the peaks to the other parts.

As a result, the single-layer interference film 15, made of the egg-shaped, thin ZnS film, can be formed along the glass beads 13, as shown in FIG. 4(B).

After the thin film is deposited, in the film base member bonding step shown in FIG. 4(B), a film base member 32 is bonded to the film shown in FIG. 4(A).

After the film base member is bonded, in the protection film removal step shown in FIG. 4(C), the protection film 30 is removed as shown in FIG. 4(B).

By the method described above, gradations are added to the optical layer thickness of the single-layer interference film 15 within the range of 100 to 600 nm when the retroreflective members of the example are created.

The retroreflective members can be divided into two types: closed type and open type. When gradations are added to the optical layer thickness, it is especially preferable to deposit the film on the open-type member.

The closed-type member has an almost flat surface in the vertical direction, as viewed from the deposition source, and the thin interference film of ZnS would have constant thickness. Therefore, the layer thickness of the reflective part changes little. The open-type member, however, has an uneven surface due to the hemispherical parts of the transparent microscopic beads, so gradations are created in the thickness of the thin interference film of ZnS, decreasing the thickness from the peaks toward the other parts.

With this production method, the layer thickness can range as follows, for instance.

Method of Measuring Layer Thickness Distribution

The layer thickness distribution of the interference film was measured as described below.

As shown in FIG. 5(A), a thin ZnS film was deposited on original bead sheeting (glass beads) 13 held by the protection film 30, and the single-layer interference film 15 was obtained as shown in FIG. 5(B).

As shown in FIG. 5(B), a double-sided tape base member 40 was bonded to the piece shown in FIG. 5(A).

As shown in FIG. 5(C), the piece shown in FIG. 5(B) was put on a stage 42, and the protection film 30 was peeled off.

As shown in FIG. 5(D), an adhesive tape 44 was bonded to the piece shown in FIG. 5(C).

As shown in FIG. 5(E), when the adhesive tape 44 was removed from the piece shown in FIG. 5(D), the glass beads 13 were also removed together with the adhesive tape 44.

From the upper surface of the interference film 15 shown in FIG. 5(F), the distribution of layer thickness (nm) of the single-layer interference film 15 was measured by an ultra depth profile measurement microscope.

The layer thickness of the single-layer interference film 15 was measured at positions shown in FIG. 6. FIG. 6(A) is a top view of the single-layer interference film 15, and FIG. 6(B) is a side view of the single-layer interference film 15. As shown in the figure, of the positions in the single-layer interference film 15 viewed from above, position P3 is at the center, and positions P1, P2, P4, and P5 are provided on the right side and on the left side at intervals of about 10 μm. Examples of layer thickness (nm) at the given positions P1 to P5 are listed in Table 6.

TABLE 6

| | Measurement position | | | | |
|---|---|---|---|---|---|
| | P1 | P2 | P3 | P4 | P5 |
| Optical layer thickness (nm) | 190 | 330 | 400 | 330 | 190 |

As a result of examining the layer thickness distribution of the single-layer interference film 15, it was found that, to obtain desired interference colors, it was preferable to add gradations to the optical layer thickness of the single-layer interference film 15 within the range of 100 to 200 nm in such a manner that the ratio of the optical layer thickness $T_{90}$ when the incident angle of light with respect to the surface of the retroreflective member is 90 degrees, the optical layer thickness $T_{75}$ when the incident angle is 75 degrees, the optical layer thickness $T_{60}$ when the incident angle is 60 degrees, the optical layer thickness $T_{45}$ when the incident angle is 45 degrees, and the optical layer thickness $T_{30}$ when the incident angle is 30 degrees satisfies the relationship 1.00:0.95:0.85:0.70:0.50.

Effects

The effects of the obtained single-layer interference film 15 will be described below with reference to FIG. 7.

FIG. 7 shows an enlarged view of the interference film 15, which is a characteristic part of the retroreflective member, and its vicinity.

As shown in the figure, the layer thickness of the interference film 15 varies as described earlier.

When the incident angle changes from 90 degrees through 60 degrees to 30 degrees, as shown at A, B, and C in FIG. 7, the zinc-sulfide film thickness of interference film parts 15a, 15b, and 15c, where the incident light is converged and reflected, changes from $T_{90}$ through $T_{60}$ to $T_{30}$ ($T_{90} > T_{60} > T_{30}$).

Because the wavelengths of light strengthened (and attenuated) by the interference of light change more strongly, so-called iridescent interference colors, which depend on the incident angle, can be obtained more clearly.

To check the performance of the retroreflective member, color tones were measured by using the samples listed below and the measurement method described below.

The retroreflective light tone measurement equipment 50 shown in the figure includes a white light source 52, a half mirror 54 (visible light reflectivity of 90%), and a non-contact imaging colorimeter 56. A sample retroreflective member 10 was placed in the optical path.

In the measurement, white linearly light was applied to the sample retroreflective member 10, and the angle of the sample 10 was varied from 90 degrees to 15 degrees. The color tones (brightness, hues, etc.) of retroreflected light were measured by the non-contact imaging colorimeter 56 at given angles.

Hues

FIG. 9 shows reflected light color images of the samples obtained by the non-contact imaging colorimeter 56. FIG. 10 shows the same results expressed in the L*a*b* colorimetric system. Table 8 below lists the observed results with respect to four items: Optical layer thickness (nm) of the interference film 15, wavelength (nm) of reflected light most strengthened by interference, incident angle (degrees) of light, and interference color of reflected light.

TABLE 7

| Interference color of first order | | | | | | | | | | | |
|---|---|---|---|---|---|---|---|---|---|---|---|
| Optical layer thickness(nm) | 100 | 110 | 120 | 130 | 140 | 150 | 160 | 170 | 180 | 190 | 200 |
| Emphasized wavelength(nm) | 400 | 440 | 480 | 520 | 560 | 600 | 640 | 680 | 720 | 760 | 800 |
| Incident angle(degree) | | | | | | 15 | | 25 | | 35 | |
| Observed interference color | | | | | | Orange | | Red | | Red purple | |

TABLE 8

| Interference color of second order | | | | | | | | | | |
|---|---|---|---|---|---|---|---|---|---|---|
| Optical layer thickness(nm) | 300 | 330 | 360 | 390 | 420 | 450 | 480 | 510 | 540 | 570 | 600 |
| Emphasized wavelength(nm) | 400 | 440 | 480 | 520 | 560 | 600 | 640 | 680 | 720 | 760 | 800 |
| Incident angle(degree) | 45 | | 60 | 75 | 90 | | | | | | |
| Observed interference color | Blue purple | | Blue | Green | Yellow green | | | | | | |

Third Example

Material of interference film: ZnS
Optical layer thickness of interference film: As indicated in Table 6
Laminated member with a transparent layer bonded to a lower part of the interference film Fourth Example Material of interference film: ZnS
Optical layer thickness of interference film: As indicated in Table 6
Laminated member with a white layer bonded to a lower part of the interference film First Comparative Example Material of reflective layer: Aluminum Second Comparative Example Infinite Color, Prevailing Blue, BP, manufactured by Shiseido Co., Ltd. (coated, titanated mica $Li_2CoTi_3O_8$: The appearance color is blue, and the interference color is purple)

Measurement Method

To measure the color tones of the obtained retroreflective member, the retroreflective light tone measurement equipment shown in FIG. 8 was used.

FIG. 9(A) showing the first comparative example indicates that when the incident angle of the white linearly light was varied from 90 degrees to 15 degrees, the color of retroreflected light did not change and remained white: white (at an incident angle of 90 degrees), white (at an incident angle of 75 degrees), white (at an incident angle of 60 degrees), white (at an incident angle of 45 degrees), white (at an incident angle of 35 degrees), white (at an incident angle of 25 degrees), and slightly dark white (at an incident angle of 15 degrees).

FIG. 9(B) showing the second comparative example indicates that when the incident angle of the white linearly light was varied from 90 degrees to 45 degrees, the color of retroreflected light remained almost blue: bluish purple (at an incident angle of 90 degrees), bluish purple (at an incident angle of 75 degrees), blue (at an incident angle of 60 degrees), and dark blue (at an incident angle of 45 degrees). At an incident angle beyond 45 degrees, the blue color became very dark, which was nearly impossible to observe.

FIG. 9(C) showing the third example indicates that when the incident angle of the white linearly light was varied from 90 degrees to 15 degrees, the color of retroreflected light changed considerably: yellowish green (at an incident angle of 90 degrees), green (at an incident angle of 75 degrees), blue (at an incident angle of 60 degrees), bluish purple (at an incident angle of 45 degrees), reddish purple (at an incident angle of 35 degrees), red (at an incident angle of 25 degrees), and orange (at an incident angle of 15 degrees).

Those results clearly show that, in the third example, the incident angle varying from 90 degrees to 15 degrees changed the color of retroreflected light greatly: yellowish green (90 degrees), green (75 degrees), blue (60 degrees), bluish purple (45 degrees), reddish purple (35 degrees), red (25 degrees), and orange (15 degrees).

In both the first comparative example and the second comparative example, the incident angle varying from 90 degrees to 15 degrees changed the hue little.

In comparison with the comparative examples, the third example changed the hue greatly with the incident angle varying from 90 to 15 degrees. This means that a wider variety of reflected light colors is provided.

Brightness

The relationship between the incident angle of the white linearly light and the brightness of the retroreflected light was measured for the samples. The results are shown in FIG. 11.

The figure clearly indicates that, like the first comparative example, the third and fourth examples showed very high brightness in a wide range of incident angles of 15 to 90 degrees, in comparison with the second comparative example.

Chroma

The relationship between the incident angle of the white linearly light and the chroma of the retroreflected light was measured for the samples. The results are shown in FIG. 12.

The figure clearly indicates that, like the first comparative example, the third and fourth examples showed very high chroma especially at an incident angle ranging from 30 to 90 degrees, in comparison with the second comparative example.

According to retroreflective members of the examples, the hues of retroreflected light varied widely at an incident angle ranging from 15 to 90 degrees, and the brightness and chroma were high. The retroreflective members exhibited both a wide variety of colors and improved light use efficiency. Therefore, the examples have further improved visibility in a wide range of incident angles from 15 to 90 degrees.

The gradations of the single-layer interference film 15 have been explained above, and the same explanation applies to the multilayer interference film 14.

Figure 1:
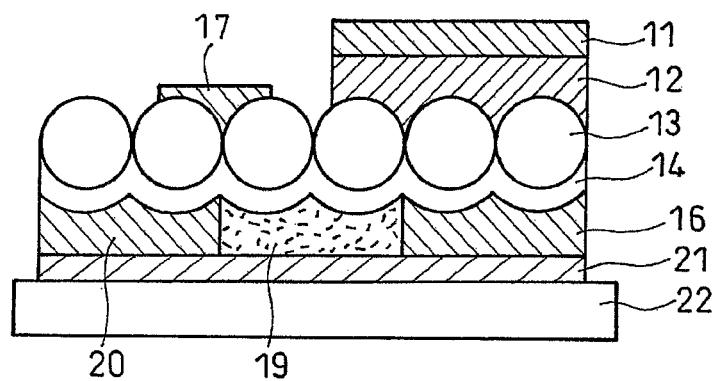
FIG. 1 is an enlarged view showing a retroreflective member having a multilayer interference film as its reflective layer, according to an embodiment of the present invention.
Figure 2:
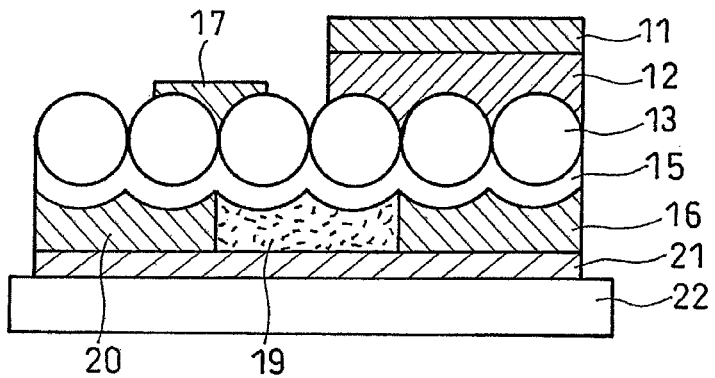
FIG. 2 is an enlarged view showing a retroreflective member having a single-layer interference film as its reflective layer, according to an embodiment of the present invention.
Figure 3:
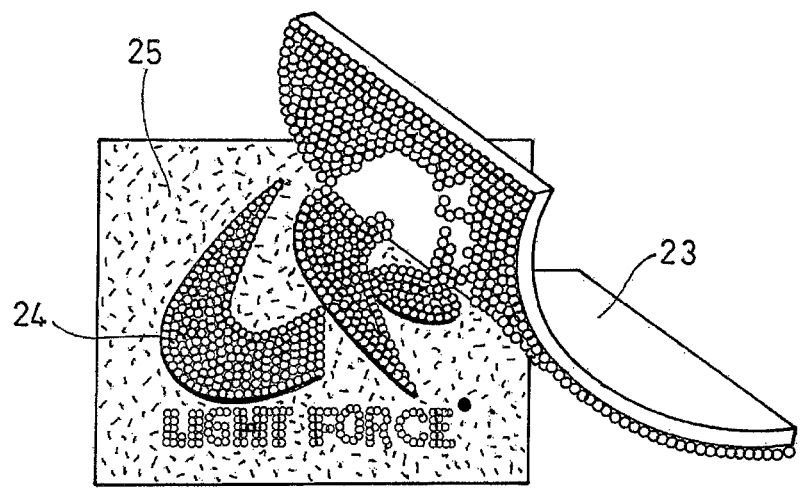
FIG. 3 is an enlarged view showing an embodiment of a patterning method of a retroreflective member according to the present invention.
Figure 4:
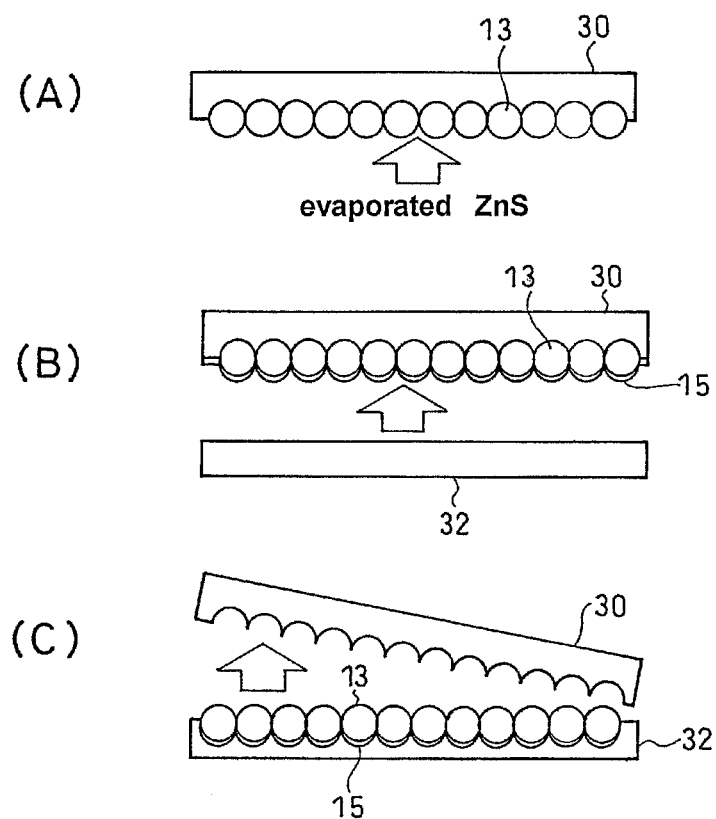
FIG. 4 is a view illustrating a method of producing a characteristic reflective layer in an example.
Figure 5:
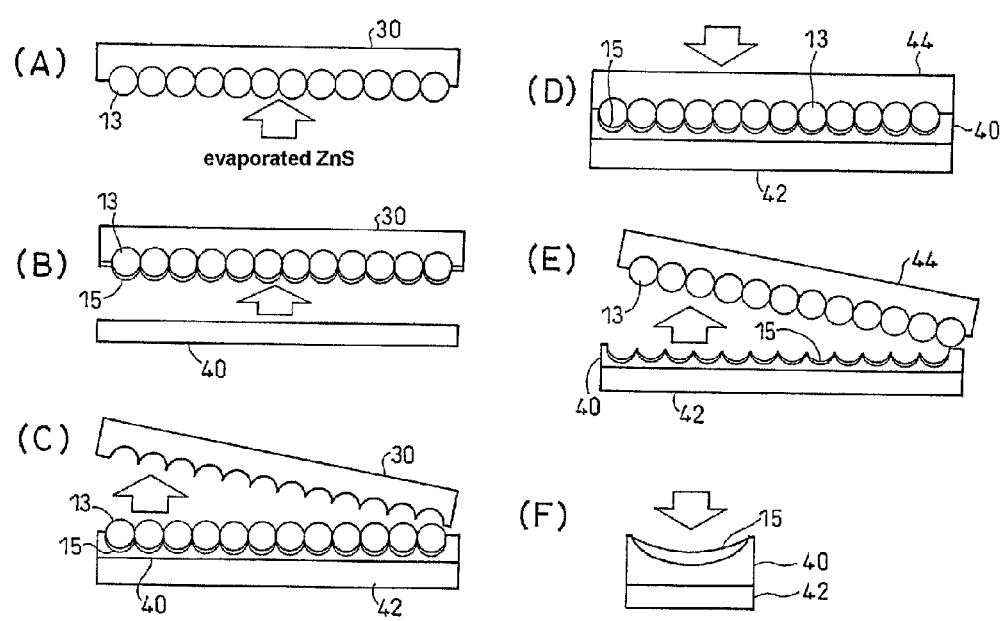
FIG. 5 is a view illustrating a method of measuring layer thickness distribution of a characteristic reflective layer in an example.
Figure 6:
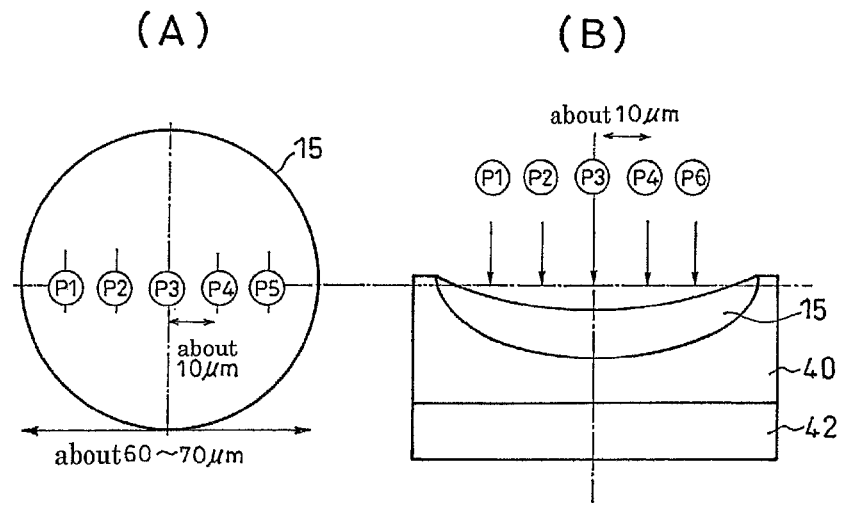
FIG. 6 is a view illustrating positions where the layer thickness distribution of the characteristic reflective layer in the example is measured.
Figure 7:
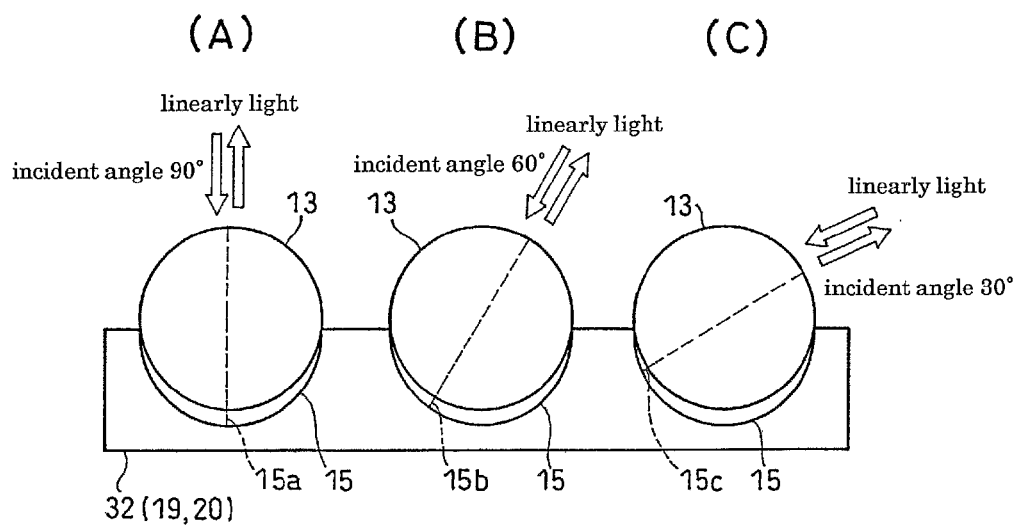
FIG. 7 is a view illustrating the effects of the characteristic reflective layer in the example.
Figure 8:
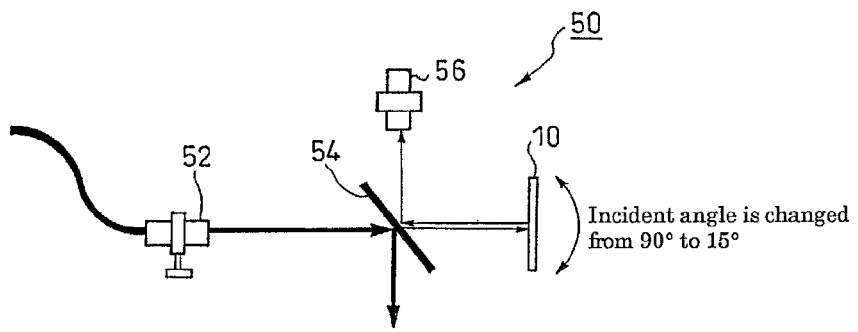
FIG. 8 is a view illustrating equipment for measuring color tones of the characteristic reflective layer in the example.
Figure 9:
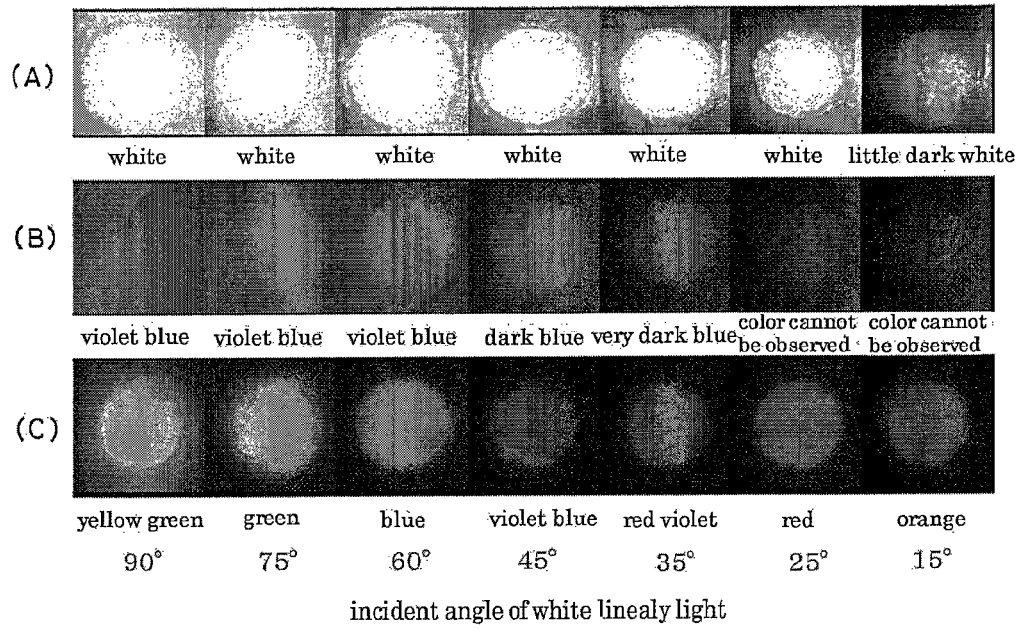
FIG. 9 shows images comparing changes in hue when the reflective layer of the example was used and when reflective layers of the related art were used.
Figure 10:
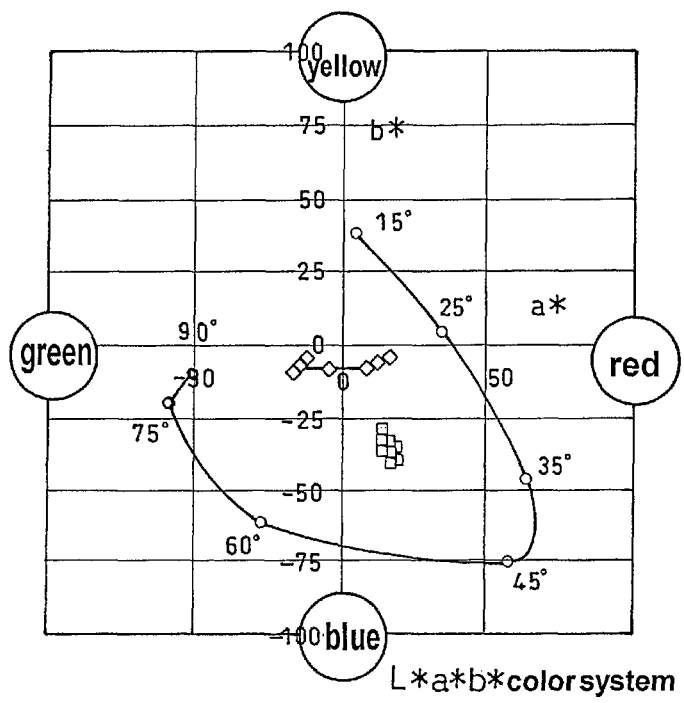
FIG. 10 is a view illustrating changes in hue when the reflective layer of the example was used and when the reflective layers of the related art were used.
Figure 11:
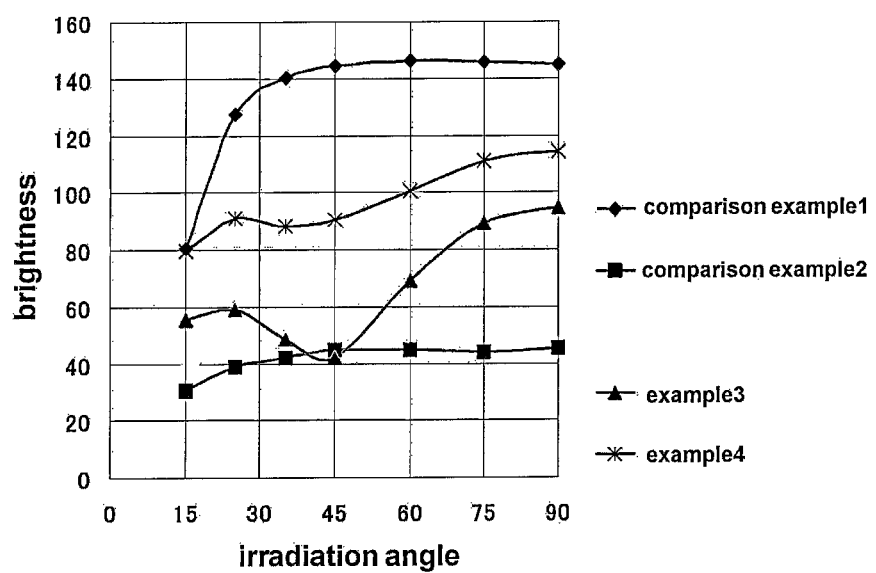
FIG. 11 is a view illustrating brightness when the reflective layers of the examples were used and when the reflective layers of the related art were used.
Figure 12:
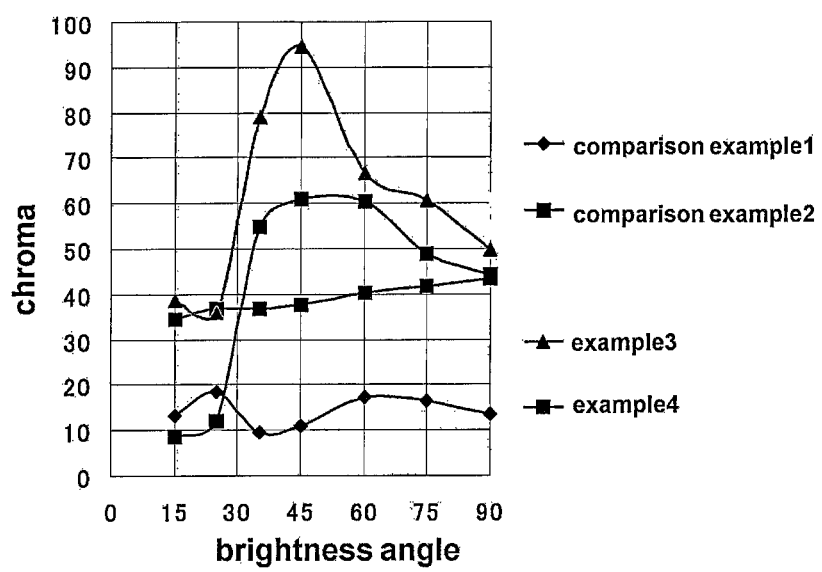
FIG. 12 is a view illustrating chroma when the reflective layers of the examples were used and when the reflective layers of the related art were used.

11 Base layer
12 Covering layer (Grass beads temporary adhesive resin layer)
13 Grass bead
14 Multilayer interference layer (interference layer)
15 Single layer interference layer (interference layer)
16 Colored resin layer
17 Resin layer upside colored resin layer
18 Reflected color pigment
19 Reflective colored resin layer (colored layer)
20 Transparent resin layer (colorless transparent layer)
21 Adhesive resin layer (adhesive layer)
22 Target surface
23 Base member sheet (11, 12, 13)
24 Shape mark (13, 14, 15, 16, 18, 19, 20, 21)
25 Target surface

What is claimed is:

1. A retroreflective member comprising a single reflective layer and transparent microscopic beads,
wherein the retroreflective member returns at least part of visible light incident at an incident angle in the direction of the incident angle at a phase difference corresponding to a visible light wavelength thereby intensifying a light component having the visible light wavelength by interference by generating a coherent light from the incident light having the phase difference and the incident light of non-phase difference, and wherein the wavelength of the intensified light component of the visible light wavelength depends on the incident angle,
wherein the single reflective layer comprises a metal compound provided just below the transparent microscopic beads that has a higher refractive index than the transparent microscopic beads;
wherein the metal compound is a material selected from the group consisting of zinc sulfide, titanium dioxide, indium oxide, zirconium dioxide, magnesium oxide, calcium fluoride, magnesium fluoride, sodium fluoride, and silicon dioxide;
wherein the single reflective layer has an optical layer thickness within the range of 0 to 600 nm;
wherein the ratio of the optical layer thickness $T_{90}$ when the incident angle of light with respect to the surface of the retroreflective member is 90 degrees, the optical layer thickness $T_{60}$ when the incident angle is 60 degrees and the optical layer thickness $T_{30}$ when the incident angle is 30 degrees satisfies the relationship 1.00:0.85:0.50; and
wherein a thickness of a transmitting part of the incident light in the optical layer has gradations within the range of 100 to 600 nm.

2. A retroreflective member according to claim 1, wherein the single reflective layer is formed of a zinc-sulfide layer having an optical layer thickness of 100 to 432 nm.

3. A retroreflective member according to claim 2, wherein a colored layer or a colorless transparent layer is provided below the single reflective layer and above the transparent microscopic beads.

4. A retroreflective member according to claim 2, wherein a colored layer, a colorless transparent layer, or a base member bonding adhesive layer is provided below the single reflective layer.

5. A retroreflective member according to claim 1, wherein gradations within the range of 100 to 600 nm are added to the optical layer thickness of the single reflective layer such that the ratio of the optical layer thickness $T_{90}$ when the incident angle of light with respect to the surface of the retroreflective member is 90 degrees, the optical layer thickness $T_{75}$ when the incident angle is 75 degrees, the optical layer thickness $T_{60}$ when the incident angle is 60 degrees, the optical layer thickness $T_{45}$ when the incident angle is 45 degrees, and the optical layer thickness $T_{30}$ when the incident angle is 30 degrees satisfies the relationship 1.00:0.95:0.85:0.70:0.50.

6. A retroreflective member according to claim 5, wherein a colored layer or a colorless transparent layer is provided below the single reflective layer and above the transparent microscopic beads.

7. A retroreflective member according to claim 5, wherein a colored layer, a colorless transparent layer, or a base member bonding adhesive layer is provided below the single reflective layer.

8. A retroreflective member according to claim 1, wherein a colored layer or a colorless transparent layer is provided below the single reflective layer and above the transparent microscopic beads.

9. A retroreflective member according to claim 8, wherein a colored layer, a colorless transparent layer, or a base member bonding adhesive layer is provided below the single reflective layer.

10. A retroreflective member according to claim 1, wherein a colored layer, a colorless transparent layer, or a base member bonding adhesive layer is provided below the single reflective layer.

\* \* \* \* \*